United States Patent
Etemad et al.

(10) Patent No.: US 9,706,522 B2
(45) Date of Patent: Jul. 11, 2017

(54) WIRELESS LOCAL AREA NETWORK (WLAN) TRAFFIC OFFLOADING

(71) Applicant: INTEL IP CORPORATION, Santa Clara, CA (US)

(72) Inventors: Kamran Etemad, Potomac, MD (US); Joey Chou, Scottsdale, AZ (US); Alexander Sirotkin, Petach Tikva (IL)

(73) Assignee: INTEL IP CORPORATION, Santa Clara, CA (US)

( * ) Notice: Subject to any disclaimer, the term of this patent is extended or adjusted under 35 U.S.C. 154(b) by 200 days.

(21) Appl. No.: 14/125,610

(22) PCT Filed: Sep. 25, 2013

(86) PCT No.: PCT/US2013/061519
§ 371 (c)(1),
(2) Date: Dec. 12, 2013

(87) PCT Pub. No.: WO2014/133589
PCT Pub. Date: Sep. 4, 2014

(65) Prior Publication Data
US 2014/0286159 A1    Sep. 25, 2014

Related U.S. Application Data

(60) Provisional application No. 61/771,698, filed on Mar. 1, 2013.

(51) Int. Cl.
*H04W 72/00* (2009.01)
*H04B 7/04* (2017.01)
(Continued)

(52) U.S. Cl.
CPC ........ *H04W 72/005* (2013.01); *H04B 7/0452* (2013.01); *H04B 7/0486* (2013.01);
(Continued)

(58) Field of Classification Search
None
See application file for complete search history.

(56) References Cited

U.S. PATENT DOCUMENTS 7,346,008 B1    3/2008  Bylsma et al.
7,362,742 B1 *  4/2008  Siddiqi ................... H04L 45/00
                                              370/350
(Continued)

FOREIGN PATENT DOCUMENTS

WO    WO 2009/137718 A1    11/2009
WO       2011/098660 A1     8/2011
WO       2011/149533 A1    12/2011

OTHER PUBLICATIONS

3GPP TR 32.841 3GPP: study on WLAN management—release 12 V 0.2.0 Oct. 2012.*
(Continued)

*Primary Examiner* — Chirag Shah
*Assistant Examiner* — Rina Pancholi
(74) *Attorney, Agent, or Firm* — Thorpe North & Western

(57) ABSTRACT

Technology for communicating access point (AP) information for traffic offloading is disclosed. A request may be received, at a wireless local area network (WLAN) domain manager (DM) from an evolved node B (eNB), for access point (AP) information about one or more WLAN access points (APs) for traffic offloading. The access point (AP) information may be obtained for the one or more WLAN APs, at the WLAN DM, based on at least in part operations and management (OAM) reports from the one or more WLAN APs containing the AP information. The AP information may be communicated, from the WLAN DM to the eNB via a network manager (NM), about the one or more WLAN APs to enable traffic offloading from the eNB to at least one of the WLAN APs.

18 Claims, 9 Drawing Sheets

(51) Int. Cl.

| | | |
|---|---|---|
| H04B 7/0452 | (2017.01) | |
| H04W 36/14 | (2009.01) | |
| H04W 36/22 | (2009.01) | |
| H04L 5/00 | (2006.01) | |
| H04L 12/741 | (2013.01) | |
| H04B 7/06 | (2006.01) | |
| H04W 24/10 | (2009.01) | |
| H04W 72/04 | (2009.01) | |
| H04W 72/08 | (2009.01) | |
| H04L 29/06 | (2006.01) | |
| H04L 29/08 | (2006.01) | |
| H04W 4/10 | (2009.01) | |
| H04W 12/02 | (2009.01) | |
| H04W 12/04 | (2009.01) | |
| H04W 76/02 | (2009.01) | |
| H04W 24/02 | (2009.01) | |
| H04W 24/08 | (2009.01) | |
| H04L 12/18 | (2006.01) | |
| H04W 52/24 | (2009.01) | |
| H04W 72/10 | (2009.01) | |
| H04W 16/14 | (2009.01) | |
| H04W 76/04 | (2009.01) | |
| H04W 36/16 | (2009.01) | |
| H04W 36/30 | (2009.01) | |
| H04J 3/12 | (2006.01) | |
| H04W 48/10 | (2009.01) | |
| H04W 48/20 | (2009.01) | |
| H04M 15/00 | (2006.01) | |
| H04L 25/03 | (2006.01) | |
| H04W 4/00 | (2009.01) | |
| H04W 88/06 | (2009.01) | |
| H04W 88/02 | (2009.01) | |
| H04W 88/08 | (2009.01) | |
| H04W 84/18 | (2009.01) | |
| H04W 4/06 | (2009.01) | |

(52) U.S. Cl.
CPC .............. *H04B 7/0626* (2013.01); *H04J 3/12* (2013.01); *H04L 5/0037* (2013.01); *H04L 12/184* (2013.01); *H04L 25/03* (2013.01); *H04L 45/74* (2013.01); *H04L 65/4038* (2013.01); *H04L 65/608* (2013.01); *H04L 65/80* (2013.01); *H04L 67/02* (2013.01); *H04M 15/8044* (2013.01); *H04W 4/10* (2013.01); *H04W 12/02* (2013.01); *H04W 12/04* (2013.01); *H04W 16/14* (2013.01); *H04W 24/02* (2013.01); *H04W 24/08* (2013.01); *H04W 24/10* (2013.01); *H04W 36/14* (2013.01); *H04W 36/165* (2013.01); *H04W 36/22* (2013.01); *H04W 36/30* (2013.01); *H04W 48/10* (2013.01); *H04W 48/20* (2013.01); *H04W 52/244* (2013.01); *H04W 72/044* (2013.01); *H04W 72/0406* (2013.01); *H04W 72/085* (2013.01); *H04W 72/087* (2013.01); *H04W 72/10* (2013.01); *H04W 76/02* (2013.01); *H04W 76/023* (2013.01); *H04W 76/04* (2013.01); *H04W 76/046* (2013.01); *H04W 4/008* (2013.01); *H04W 4/06* (2013.01); *H04W 84/18* (2013.01); *H04W 88/02* (2013.01); *H04W 88/06* (2013.01); *H04W 88/08* (2013.01); *Y02B 60/50* (2013.01)

(56) References Cited

U.S. PATENT DOCUMENTS

| | | | |
|---|---|---|---|
| 2006/0092890 A1 | 5/2006 | Gupta et al. | |
| 2010/0003980 A1 | 1/2010 | Rune et al. | |
| 2011/0019582 A1 | 1/2011 | Okmyanskiy | |
| 2011/0317571 A1* | 12/2011 | Kokkinen | H04W 24/00 370/252 |
| 2012/0113965 A1* | 5/2012 | Puthenpura | H04W 28/08 370/338 |
| 2012/0157096 A1 | 6/2012 | Baek et al. | |
| 2012/0230191 A1* | 9/2012 | Fang | H04W 36/22 370/235 |
| 2012/0269134 A1* | 10/2012 | Jin | H04W 28/085 370/328 |
| 2013/0042316 A1* | 2/2013 | Lappetelainen | H04W 48/18 726/10 |
| 2014/0160937 A1* | 6/2014 | Richards | H04W 12/06 370/236 |

OTHER PUBLICATIONS

International Search Report and Written Opinion received for PCT Patent Application No. PCT/US2013/061519, mailed on Jan. 28, 2014, 17 pages.

3GPP; TSGSSA; Telecommunication Management; Study on WLAN Management, Release 12, Feb. 19, 2013, 10 pages. Available at :http://www.3gpp.org/DynaReport/32841.html.

Etemad, et al., "Devices and Methods for Radio Communication Network Guided Traffic Offload", U.S. Appl. No. 13/687,442, filed Nov. 28, 2012, 30 pages.

* cited by examiner

WIRELESS LOCAL AREA NETWORK (WLAN) TRAFFIC OFFLOADING

RELATED APPLICATIONS

The present application claims priority to U.S. Provisional Patent Application No. 61/771,698, filed Mar. 1, 2013, the entire specification of which is hereby incorporated by reference in its entirety for all purposes.

BACKGROUND

As the use of mobile wireless devices, such as smart phones and tablet devices, becomes more ubiquitous, the demands on the limited amount of radio frequency spectrum used by those devices also increases, resulting in wireless network congestion in the licensed spectrum. In addition, the increased use of high bandwidth applications such as audio and video streaming can increase demands beyond the capability of the available spectrum. This is especially true in high density and high use locations such as large cities and universities.

Although improvements in wireless architectures, hardware design, and processor speed have significantly increased the efficiency of wireless devices in their use of the available spectrum, the ability to transmit a greater number of bits per second per hertz of available bandwidth may be reaching an upper limit with the currently available technology.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
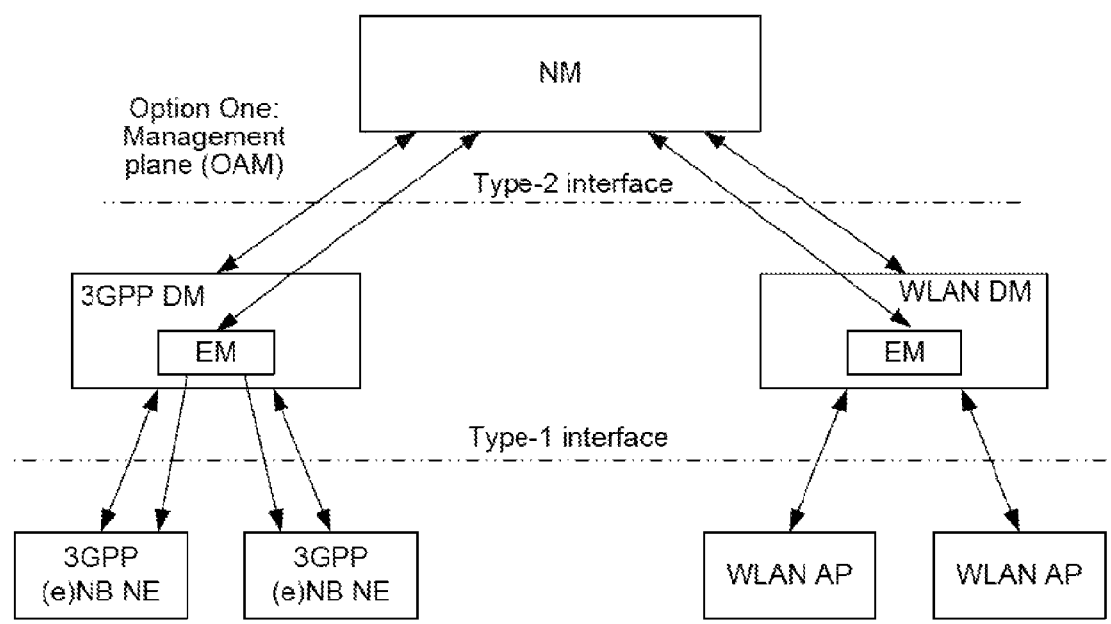
FIG. 1 is a diagram illustrating a Third Generation Partnership Project (3GPP) node receiving wireless local area network (WLAN) access point (AP) information for traffic offloading from a WLAN domain manager (DM) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), (e.g. Releases 8, 9, 10 or 11), the Institute of Electrical and Electronics Engineers (IEEE) 802.16 standard (e.g., 802.16e or 802.16m), which is commonly known to industry groups as WiMAX (Worldwide interoperability for Microwave Access), and the IEEE 802.11 standard (e.g. 802.11-2012, 802.11ac, 802.11ad), which is commonly known to industry groups as WiFi.

An exponential increase in the amount of wireless data transmission has created congestion in wireless networks using licensed spectrum to provide wireless communication services for wireless devices such as smart phones and tablet devices, to name a few. The congestion is especially apparent in high density and high use locations such as urban locations and universities.

One technique for providing additional bandwidth capacity to wireless devices is through the use of unlicensed spectrum, given the limited availability and high cost of licensed spectrum. Many types of wireless devices are capable of communicating via licensed spectrum, such as through a cellular network, and via unlicensed spectrum, such as via a WiFi hotspot. WiFi is a common name provided to the IEEE 802.11 set of standards for communicating in unlicensed spectrum including the 2.4, 3.7 and 5 GHz frequency bands. The set of standards includes the IEEE 802.11a standard released in 1999 for communication in the 5 GHz and 3.7 GHz band, the IEEE 802.11b standard, also released in 1999 for communication in the 2.4 GHz band, the 802.11g standard released in 2003 for communication in the 2.4 GHz range via orthogonal frequency division multiplexing (OFDM) and/or direct sequence spread spectrum (DSSS), and the 802.11n standard released in 2009 for communication in the 2.4 GHz and 5 GHz bands using multiple-input multiple-output (MIMO).

While WiFi has been given as an example of a standard used to communicate via an unlicensed portion of the radio frequency spectrum additional standards for communicating in a portion of the unlicensed spectrum may also be used, including the IEEE 802.15 family of personal area networks (PAN), Bluetooth, or other wireless local area network standards.

The increased demand on wireless network resources may lead to an increase in WiFi offloading. In other words, wireless network carriers may ease the strain on the wireless network by offloading an increasing amount of data traffic onto WiFi and other local networks, such as small cell networks. WiFi offloading may mitigate network congestion and deteriorated network quality because of the increase in mobile broadband devices. Offloading data to the existing wired networks may be simpler than expanding the cellular network. Therefore, wireless network carriers may offload data to WiFi networks, as well as small cell networks, such as micro cells, pica cells, and femto cells. As a result, the higher bandwidth availability may increase the quality of service (QoS) for end users.

Since the spectrum allocated to cellular networks remains scarce, cellular networks may be unable to accommodate the growing demand for mobile data driven by mobile devices, such as smartphones. On the other hand, the spectrum allocated for Wi-Fi networks is significantly greater than that allocated for cellular networks. Moreover, the spectrum allocated to Wi-Fi networks is unlicensed, thus incurring no additional spectrum licensing costs to the Wi-Fi providers. Therefore, mobile data offloading from IP-based cellular networks to networks may be an attractive mechanism to mitigate the spectrum scarcity faced by cellular networks.

In order to optimize traffic offloading between the 3GPP radio access network (RAN) or 3GPP node and a plurality of WiFi networks in high loading conditions, it may be beneficial to provide user equipments (UEs), such as mobile devices, with information regarding candidate or desired wireless access points (APs). Wireless APs, such as WLAN APs, allow mobile devices to connect to a wired network using WiFi or related standards. The candidate WLAN APs for traffic offloading may be within coverage of the 3GPP node. In general, the eNB may obtain the AP information about the underlaid WLAN APs with minimal impact on the WLAN and the 3GPP network.

For example, the UE may receive AP information about a plurality of underlaid WLAN APs associated with the 3GPP node. The AP information may include at least one of: WLAN/AP selection parameters and preferences, or WLAN traffic load parameters defining overall offload behavior. Based on the AP information, the UE may timely and efficiently select at least one of the WLAN APs and trigger an offloading procedure to receive user data from the selected WLAN AP rather than the 3GPP node. In addition, the UE may use the AP information whether the 3GPP network initiates the traffic offloading or the UE initiates the traffic offloading. In one example, the 3GPP node may broadcast or unicast the assistance information to the UEs. In one configuration, increased power efficiency and power saving may result from the UE using the AP information to identify and select WiFi APs for traffic offloading.

Traffic offloading between the 3GPP node and the WiFi networks may be guided by the 3GPP RAN. The 3GPP node may be informed of viable underlying WLAN APs (i.e., semi-dynamic offload related assistance information). The 3GPP node may communicate the assistance information (i.e., the AP information) to the UEs, thereby aiding the UEs in quickly identifying and associating with the most desired WLAN APs.

TABLE 1

Examples of AP specific information about the WLAN which may be requested by the 3GPP eNB

| | |
|---|---|
| WLAN Network Information | Information about each candidate WLAN AP |
| networkidentifier | Combination of SSID, BSSID and HESSID, or other unique identifiers aligned with ANDSF if there are defined or provisioned WiFi network profiles |
| radioParameters | Channel identifier, Frequency bands, Max Date Rate |
| AP_Preference | Preference level for AP (e.g., preferred = 00, normal = 01, non-preferred = 10, reserve = 11). Alternatively, the AP_Preference parameter may quantitatively show the radio and backhaul loading level at the AP |
| Location | Location of the WLAN AP |

Table 1 includes examples of AP information which may be requested, at a 3GPP eNB, from a WLAN management entity. The AP information may include the network identifiers, the radio parameters, the preference levels, and the location information for each of the candidate WLAN APs. While some types of WLAN information (e.g., network ID, radio parameters) are static and do not typically change, other types of WLAN information (e.g., AP preference level) may vary depending on various conditions. In one example, an inter radio access technology (RAT) WiFi measurement configuration may be used to determine the WLAN information. A RAT is a wireless communication scheme, defined by a wireless standard. As previously discussed, wireless wide area network (WWAN) standards include the 3GPP LTE standard and the IEEE 802.16 standard. WLAN and WPAN standards include IEEE 802.11, IEEE 802.15, and the Bluetooth standard.

The WLAN network information may include a network identifier. The network identifier may be a combination of a service set identifier (SSID), a basic service set identifier (BSSID), and a homogeneous extended service set identifier (HESSID). The SSID is the name of the WLAN and all wireless devices on the WLAN may employ the same SSID in order to communicate with each other. The BSSID is the medium access control (MAC) address (i.e., a hardware address) of the WiFi chipset running on the wireless access point (AP). A HESSID includes an SSID associated with a particular AP and a network identification corresponding to a supported subscription service provider network (SSPN).

The UE may use a combination of the SSID, BSSID, and HESSID for identifying and selecting WLAN APs for traffic offloading.

In addition, the network identifier may include other unique identifiers aligned with the access network discovery and selection function (ANDSF) entity if there are defined or provisioned WiFi network profiles. The ANDSF is an entity within an evolved packet core (EPC) of the system architecture evolution (SAE) for 3GPP compliant mobile networks. In general, the ANDSF entity assists UEs to discover non-3GPP access networks—such as Wi-Fi or WIMAX—that can be used for data communications.

The WLAN network information may include radio parameters, such as a channel identifier, frequency bands, or a maximum data rate. The UE may use the radio parameters associated with a candidate WLAN AP for determining whether to select the candidate WLAN AP for traffic offloading. In addition, the WLAN network information may include a plurality of AP preference level, such as preferred=00, normal=01, non-preferred=10, and reserve=11. For example, a UE may prefer to receive data from a particular AP (e.g., with an AP preference level of 00) in comparison to a different AP (e.g., with an AP preference level of 10). In addition, the AP preference level may indicate the WiFi AP radio and backhaul loading level. The backhaul loading level may also be known as a basic service set (BSS) load level that is defined in the IEEE 802.11 standard. Furthermore, the WLAN network information may include location information associated with the WLAN APs. The UE may use the location information to scan for WLAN APs that are located in proximity to the UE. Thus, the 3GPP eNB may request the WLAN network information about the underlying WLAN APs, such as the network identifiers, radio parameters. AP preference levels, and location information associated with each of the underlying WLAN APs. The 3GPP eNB may communicate the received WLAN network information to the UE to enable the UE to identify and associate with desired WLAN APs for traffic offloading.

The 3GPP eNB may receive the AP information about nearby or underlying WLAN APs using a number of options, including but not limited to: (1) The 3GPP eNB may receive the AP information from a WLAN management entity using a management plane. (2) The 3GPP eNB may receive the AP information from the WLAN APs via a direct eNB-AP interface over the control plane. (3) The 3GPP eNB may receive the AP information from inter-RAT reports from a plurality of mobile devices. (4) The 3GPP eNB may directly receive the AP information when the 3GPP eNB is collocated or integrated with the WLAN AP. (5) The 3GPP eNB may receive the AP information using application signaling with the access network discovery and selection function (ANDSF) entity. Thus, there may be numerous approaches to provide the 3GPP RAN with WLAN AP discovery and status information.

A trade-off between the timely exchanges of AP information may be made with reporting signaling overhead. In other words, the 3GPP eNB may desire to receive AP information in a timely manner from the WLAN APs, but at the same time, without drastically increasing the signaling overhead. Therefore, to allow flexibility for such trade-offs, the inter radio access technology (inter-RAT) information reporting (i.e., the frequency at which the AP information is reported to the 3GPP eNB) may be configured to be one of: periodic, event based, or event periodic. If the inter-RAT information reporting is configured to be periodic, then the 3GPP eNB may receive an initial full report regarding the AP information followed by delta reports additional AP update information reports) every N seconds. If the inter-RAT information reporting is configured to be event-based, then the 3GPP eNB may receive an initial fail report regarding the AP information followed by delta reports (i.e., additional AP update information reports) when an event condition (e.g. the AP information has been changed) is met. If the inter-RAT information reporting is configured to be event periodic, then the 3GPP eNB may receive an initial full report regarding the AP information followed by delta reports (i.e., additional AP update information reports) every N seconds as long as an event condition is met.

FIG. 1 is a diagram illustrating a 3GPP eNB receiving WLAN AP information for traffic offloading from a WLAN domain manager (DM) via a network manager (NM). The WLAN management level information (i.e., the AP information) related to traffic offloading may be communicated between the 3GPP eNB and the WLAN DM over the management plane. In general, the WLAN DM may provide element management functions and domain management functions for a sub-network. The WLAN DM may be associated with a WLAN element manager (EM), which generally provides element management function and sub-network management functions. The WLAN DM may provide the AP information to the 3GPP eNB using a push and/or pull mechanism.

In one example, the WLAN DM may receive the AP information from a plurality of WLAN APs. As previously discussed, the AP information may include network identifiers, radio parameters, AP preference levels and/or AP location information. In addition, the WLAN DM may retrieve operations and management (OAM) reports from the WLAN APs in relation to the APs' changing status (e.g., radio and backhaul loading). For example, the WLAN DM may obtain AP information for a plurality of WLAN APs based on a pulling mechanism or trigger based reporting from the WLAN APs. In other words, the triggering mechanism may be implemented in the WLAN APs, such that the AP information may be communicated to the WLAN DM periodically or triggered by an event. In addition, the AP information obtained at the WLAN DM may be reported to a network manager (NM) in a periodic, an event based, or an event periodic manner.

In one example, the 3GPP eNB may request AP information about nearby or underlying APs from the NM. The 3GPP eNB may communicate the request to the NM via the 3GPP DM. The eNB may determine the frequency or under which conditions to initiate the request for the AP information from the NM. For example, if the eNB is overloaded, the eNB may determine to request the AP information from the WLAN DM. Upon receiving the AP information, the eNB may provide the AP information to the UE for assisting the UE in selecting a desired WLAN AP for offloading. In one configuration, the eNB may request AP information that is associated with WLAN APs in a particular location or area.

The 3GPP eNB may communicate the request for AP information to the NM via the 3GPP DM. As previously discussed, the NM may have obtained AP information about the WLAN APs from the WLAN DM. The NM may communicate the requested AP information to the 3GPP eNB via the 3GPP DM. The AP information may include an initial report with both static and dynamic information in relation to the WLAN APs. The NM may communicate subsequent reports with delta information and updates in relation to the WLAN APs. In an alternative configuration, the NM may request the AP information from the WLAN DM in response to receiving the request for the AP information from the 3GPP eNB. Upon receiving the AP information from the WLAN DM, the NM may communicate the AP information to the 3GPP eNB via the 3GPP DM.

In one configuration, the 3GPP eNB may initially request the AP information about the plurality of WLAN APs upon determining that traffic offloading is needed. The 3GPP eNB may receive the AP information in response to communicating the request to the NM and subsequently push updated AP information to the 3GPP eNB. Alternatively, the NM may preemptively push the AP information regarding the status of the WLAN APs to the eNB. The eNB may cache the AP information and upon determining that the eNB is overloaded, the eNB may communicate the AP information from its cache to the UEs to assist in traffic offloading.

Since the number of WLAN APs in a 3GPP network may be large, the AP information sent to each eNB may be limited based on the eNB's location and coverage area. The eNB's location and coverage area may be known in the NM, but may also be included in the eNB's request message to the WLAN DM. Therefore, the WLAN DM may communicate AP information relating to the APs that are associated with the eNB's location and coverage area.

In one example, the NM may cache the AP information obtained from the WLAN DM. Thus, when the NM receives a request for the AP information from the 3GPP eNB via the 3GPP DM, the NM may communicate the AP information from its cache to the 3GPP node. If the NM receives a request for the AP information from the 3GPP node and the AP information is not cached, then the NM may request the AP information from the WLAN DM.

In one example, the WLAN DM may cache the AP information obtained from the plurality of WLAN APs. Thus, when the WLAN DM receives a request for the AP information from the NM, the WLAN DM may communicate the AP information from its cache to the NM. If the WLAN DM receives a request for the AP information from the NM and the AP information is not cached, then the WLAN DM may request the AP information from the plurality of WLAN APs.

Figure 2A:
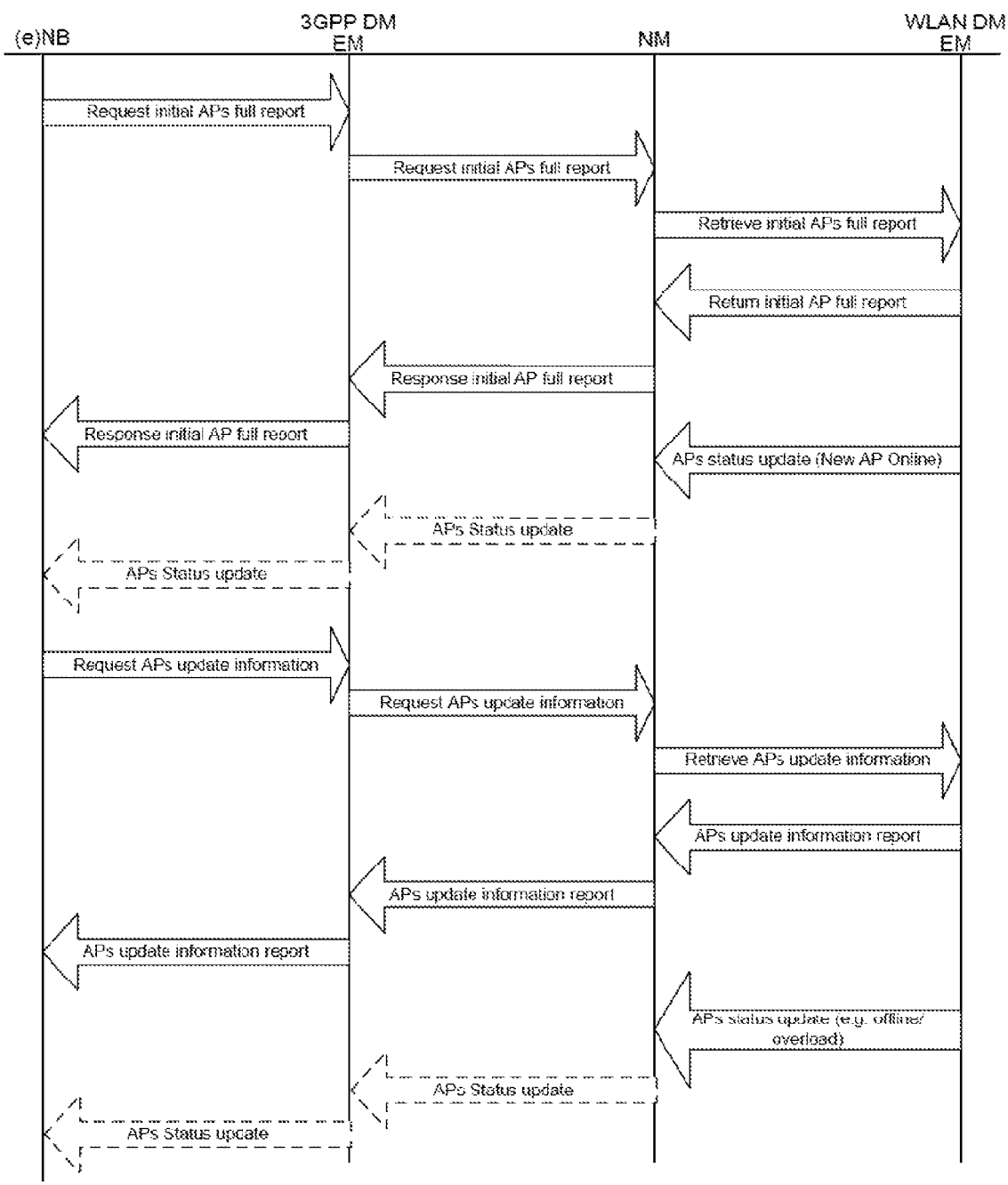
FIG. 2A is a diagram illustrating a Third Generation Partnership Project (3GPP) node receiving wireless local area network (WLAN) access point (AP) information for traffic offloading from a WLAN domain manager (DM) via a 3GPP DM and a network manager (NM) in accordance with an example.

FIG. 2A is a diagram illustrating a 3GPP eNB receiving WLAN AP information fur traffic offloading from a WLAN domain manager (DM) via a 3GPP DM and a network manager (NM). As previously discussed, an overloaded 3GPP eNB may determine to offload traffic to WLAN APs in order to ease the strain on the eNB. The 3GPP eNB may request an initial full report for a plurality of APs (i.e., AP information) from the 3GPP DM. The 3GPP DM may communicate the request to the NM. The NM may retrieve the AP information by communicating the request to the WLAN DM. In response the WLAN DM may communicate the initial full report for the plurality of APs (i.e., the AP information) to the NM. The NM may communicate the AP information to the 3GPP DM. The 3GPP DM may communicate the AP information to the 3GPP eNB. The 3GPP eNB may communicate the AP information to a plurality of UEs, such that the UEs may use the AP information to select WLAN APs for traffic offloading. As a result, the UEs may receive user data through the selected WLAN APs, thereby reducing the strain on the 3GPP eNB.

In one configuration, the WLAN DM may communicate updated status information in relation to the plurality of APs (i.e., updated AP information). The WLAN DM may receive the updated AP information from the plurality of APs using a periodic or event-based triggering mechanism. As an example, the updated AP information may include a new AP that is online. As an additional example, the updated AP information may include that a particular AP is offline or that a particular AP is overloaded. Upon receiving the updated AP information, the NM may communicate the updated AP information to the 3GPP DM. In addition, the 3GPP DM may communicate the updated AP information to the 3GPP eNB. In one example, the NM and the 3GPP DM may communicate the updated AP information to the 3GPP DM and the 3GPP eNB, respectively, using a pull mechanism, as shown by the dashed lines in FIG. 2A. The 3GPP eNB may communicate the AP status update to the plurality of UEs, such that the UEs may use the AP status update to potentially reselect WLAN APs for traffic offloading.

In one example, the 3GPP eNB may request AP update information from the 3GPP DM. The 3GPP DM may communicate the request for AP update information to the NM. The NM may retrieve the AP update information by communicating the request to the WLAN DM. In response the WLAN DM may communicate a report containing the AP update information to the NM. The NM may communicate the report containing the AP update information to the 3GPP DM. The 3GPP DM may communicate the report containing the AP update information to the 3GPP eNB. The 3GPP eNB may communicate the report containing the AP update information to the plurality of UEs, such that the UEs may use the AP update information to potentially reselect WLAN APs for traffic offloading.

Figure 2B:
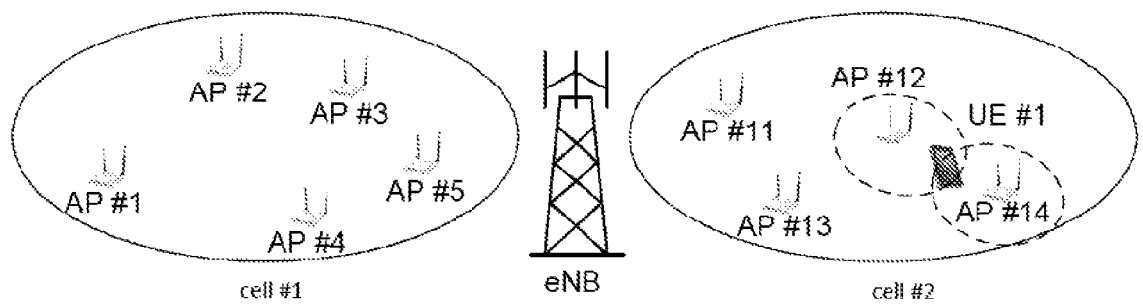
FIG. 2B is a diagram illustrating an evolved node B (eNB) and its underlaid wireless local area network (WLAN) access points (APs) in accordance with an example.

FIG. 2B illustrates an example of an eNB and its underlaid WLAN APs. The eNB may provide service for cell #1 and cell #2. Cell #1 may include a plurality of WLAN access points, such as AP #1-AP #5. Cell #2 may include a plurality of WLAN access points, such as AP #11-AP #14. In one example, UE #1 may be proximate to both AP #12 and AP #14. Therefore, the UE may decide to receive user data via traffic offloading from either AP #12 or AP #14 based on a number of factors.

Figure 3:
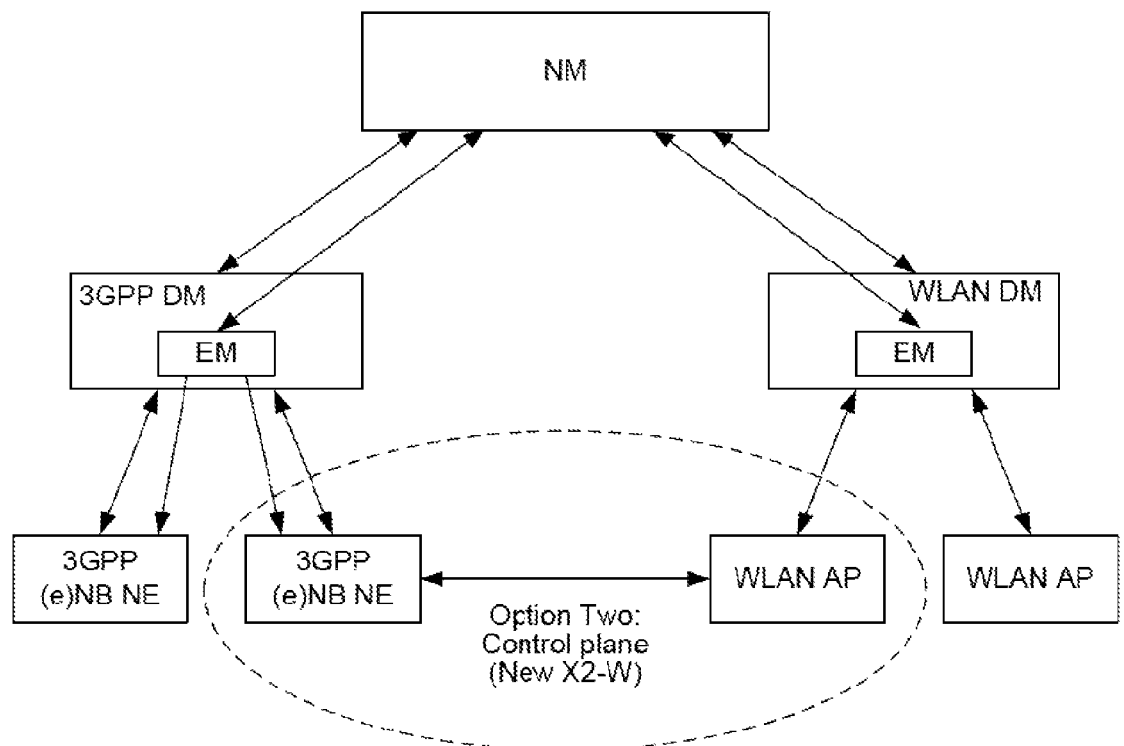
FIG. 3 is a diagram illustrating a Third Generation Partnership Project (3GPP) node receiving wireless local area network (WLAN) access pout (AP) information for traffic offloading via a direct connection with the WLAN APs in accordance with an example.

FIG. 3 is a diagram illustrating a 3GPP eNB receiving WLAN AP information for traffic offloading via a direct connection with the WLAN APs. In particular, the 3GPP eNB may receive the AP information from the WLAN APs via a direct eNB-AP interface over the control plane. In addition, the 3GPP eNB may communicate the AP information with the WLAN APs using an X2 interface. The AP information may include the network identifiers, the radio parameters, the preference levels, and the location information for each of the candidate WLAN APs. In addition, the AP information may include AP status updates, such as when a new AP is online, or when a particular AP goes offline or is overloaded).

Figure 4:
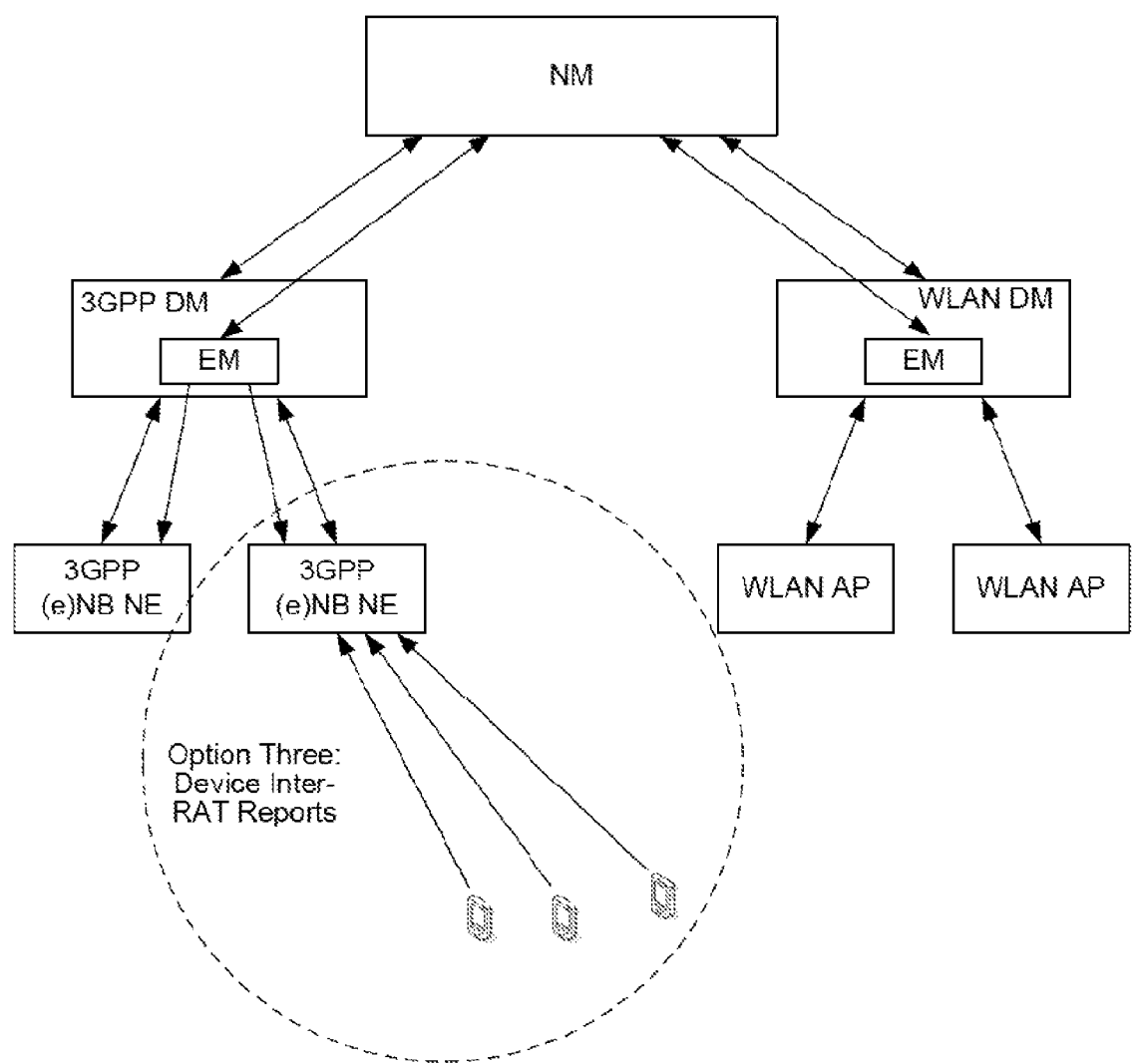
FIG. 4 is a diagram illustrating a Third Generation Partnership Project (3GPP) node receiving wireless local area network (WLAN) access point (AP) information for traffic offloading via user equipment (UE) measurement reports in accordance with an example.

FIG. 4 is a diagram illustrating a 3GPP eNB receiving WLAN AP information for traffic offloading via user equipment (UE) measurement reports. In particular, the 3GPP eNB may receive the AP information from inter-RAT reports (also known as UE assistance/measurement reports) from a plurality of mobile devices. The UEs may measure power levels and additional information associated with a plurality of WLAN APs. The UEs may scan and perform these WLAN AP measurements periodically or based on an event triggering mechanism. In addition, the UE may report the WLAN AP measurements to the 3GPP eNB using au inter-RAT reporting mechanism. The UE may report the WLAN AP measurements to the 3GPP eNB periodically or based on the occurrence of an event. When the 3GPP eNB determines that it is overloaded, the 3GPP eNB may use the WLAN AP measurements to assist the UE in identifying and associating with desired WLAN APs for traffic offloading.

In one configuration, the 3GPP eNB may directly receive the AP information when the 3GPP eNB is collocated or integrated with the WLAN AP. In other words, the WiFi radio may be integrated with 3GPP small cells, or centralized radio access networks (CRANs). Therefore, the WiFi radio may be internally and directly visible to the 3GPP eNB. In addition, interactions may be designed between the WiFi radio and the 3GPP eNB via a proprietary interface. Therefore. AP information about the WiFi radio may be directly communicated to the 3GPP eNB. The 3GPP eNB may communicate the AP information to the UEs to assist the UE in traffic offloading. In one example, a proprietary external interface may be used to communicate AP information when the 3GPP eNB is not integrated with the WiFi radio.

In one configuration, the 3GPP eNB may receive the AP information using application signaling with the access network discovery and selection function (ANDSF) entity. The ANDSF is an entity within an evolved packet core (EPC) of the system architecture evolution (SAE) for 3GPP compliant mobile networks. In general, the ANDSF entity assists UEs to discover non-3GPP access networks—such as a Wi-Fi network—that can be used for data communications. The eNB may interact with the ANDSF entity at an application layer in a manner similar to when the UEs obtain information about underlying operator managed WLAN APs. In addition, the ANDSF entity may provide the UE with rules regulating the connection to the non-3GPP access networks (e.g., WiFi networks).

Figure 5:
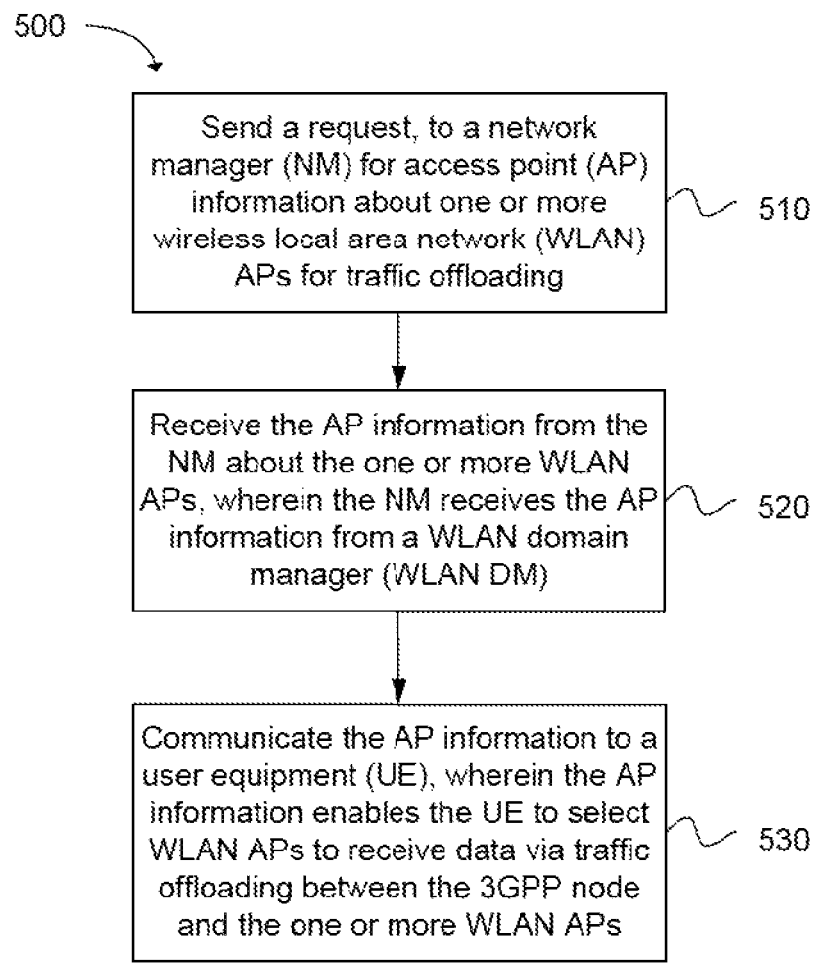
FIG. 5 depicts functionality of computer circuitry of a Third Generation Partnership Project (3GPP) node operable to receive information about access points (APs) for traffic offloading in accordance with an example.

Another example provides functionality 500 of computer circuitry of a Third Generation Partnership Project (3GPP) node operable to receive information about access points (APs) for traffic offloading, as shown in the flow chart in FIG. 5. The functionality may be implemented as a method or the functionality may be executed as instructions on a machine, where the instructions are included on at least one computer readable medium or one non-transitory machine readable storage medium. The computer circuitry can be configured to send a request, to a network manager (NM) for access point (AP) information about one or more wireless local area network (WLAN) APs for traffic offloading, as in block 510. The computer circuitry can be configured to receive the AP information from the NM about the one or more WLAN APs, wherein the NM receives the AP information from a WLAN domain manager (WLAN DM), as in block 520. The computer circuitry can be further configured to communicate the AP information to a user equipment (UE), wherein the AP information enables the UE to select WLAN APs to receive data via traffic offloading between the 3GPP node and the one or more WLAN APs, as in block 530.

In one example, the AP information includes at least one of network identifiers, radio parameters, preference levels, and location information for the WLAN APs. In addition, the AP information requested by the 3GPP node corresponds to a plurality of underlaid WLAN APs.

In one configuration, the computer circuitry may be further configured to send an update request, to the NM via the 3GPP DM, for updated AP information about the one or more WLAN APs; receive the updated AP information, from the NM via the 3GPP DM, about the one or more WLAN APs; and communicate the updated information to the UE, wherein the UE selects the WLAN AP to receive data via traffic offloading using the updated AP information.

In one configuration, the computer circuitry may be further configured to receive the AP information from a WLAN AP collocated with the 3GPP node, wherein the AP information is received at least one of: periodically or in response to an event. In addition, the computer circuitry may be configured to receive the AP information directly from the one or more WLAN APs for traffic offloading.

In one configuration, the computer circuitry may be further configured to receive the AP information from UE assistance reports, the UE assistance reports including UE measurements of power levels associated with the WLAN APs selected for traffic offloading. In addition, the computer circuitry may be configured to communicate with an access network discovery and selection function (ANDSF) to receive the AP information.

In one example, the UE includes an antenna, a touch sensitive display screen, a speaker, a microphone, a graphics processor, an application processor, internal memory, or a non-volatile memory port. In addition, the 3GPP node is selected from a group consisting of a base station (BS), a Node B (NB), an evolved Node B (eNB), a baseband unit (BBU), a remote radio head (RRH), a remote radio equipment (RRE), or a remote radio unit (RRU).

Figure 6:
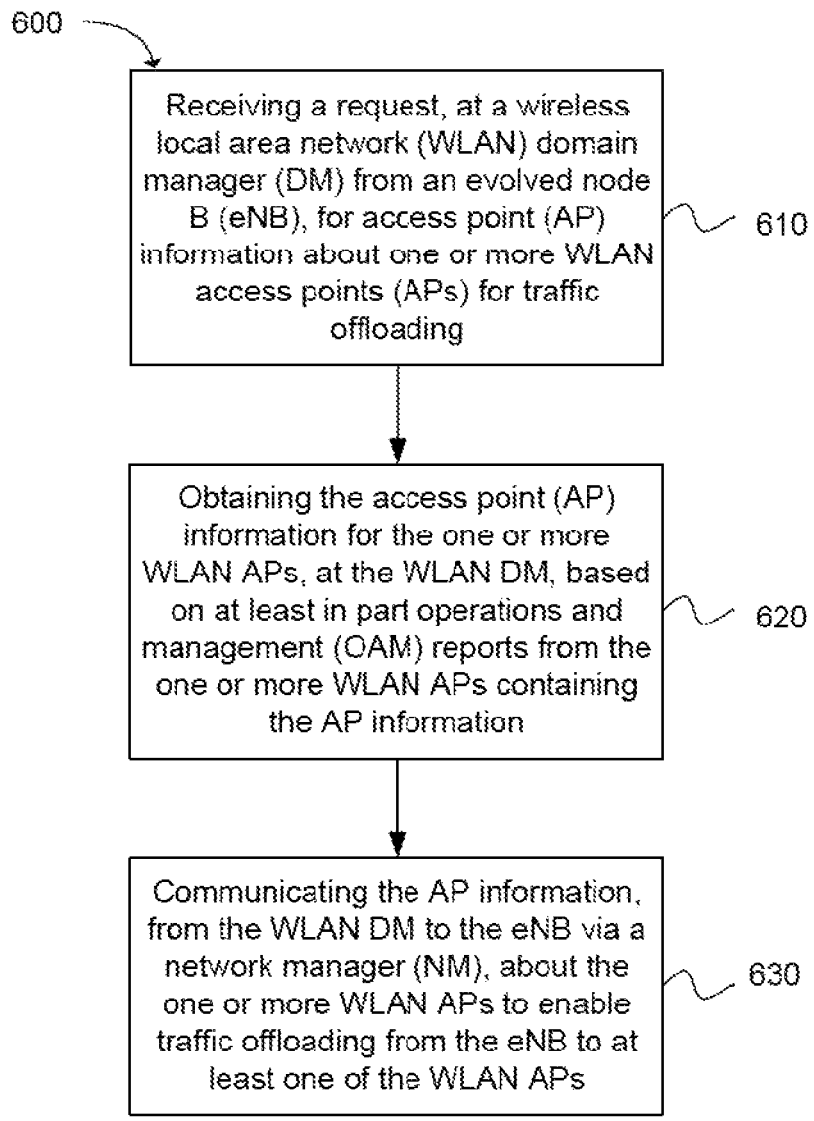
FIG. 6 depicts a flow chart of a method for communicating access point (AP) information for traffic offloading in accordance with an example.

Another example provides a method 600 for communicating access point (AP) information for traffic offloading, as shown in the flow chart in FIG. 6. The method may be executed as instructions on a machine, where the instructions are included on at least one computer readable medium or one non-transitory machine readable storage medium. The method includes the operation of receiving a request, at a wireless local area network (WLAN) domain manager (DM) from an evolved node B (eNB), for access point (AP) information about one or more WLAN access points (APs) for traffic offloading, as in block 610. The method can include the operation of obtaining the access point (AP) information for the one or more WLAN APs, at the WLAN DM, based on at least in part operations and management (OAM) reports from the one or more WLAN APs containing the AP information, as in block 620. The next operation of the method can include communicating the AP information, from the WLAN DM to the eNB via a network manager (NM), about the one or more WLAN APs to enable traffic offloading from the eNB to at least one of the WLAN APs, as in block 630.

In one configuration, the method can include communicating the AP information, from the WLAN DM to the eNB, via a network manager (NM) and a Third Generation Partnership Project (3GPP) domain manager (DM). In addition, the method can include receiving the OAM reports containing the AP information, at the WLAN DM, based on a pulling mechanism to retrieve the AP information. Furthermore, the method can include receiving the OAM reports containing the AP information based on a triggering mechanism implemented at the WLAN AP, at the WLAN DM, wherein the triggering mechanism is at least one of: periodic, event based, or event periodic. In one example, the AP information includes at least one of network identifiers, radio parameters, preference levels, and WLAN AP location information.

In one configuration, the method can include communicating the WLAN AP location information to the UE, wherein the UE identifies WLAN APs located in proximity to the UE based on the WLAN AP location information. In addition, the method call include receiving updated AP information about the one or more WLAN APs based on OAM reports from the WLAN APs; and communicating the updated AP information, from WLAN DM to the NM, about the WLAN APs, wherein the eNB receives the updated AP information via the NM and the 3GPP EM.

Figure 7:
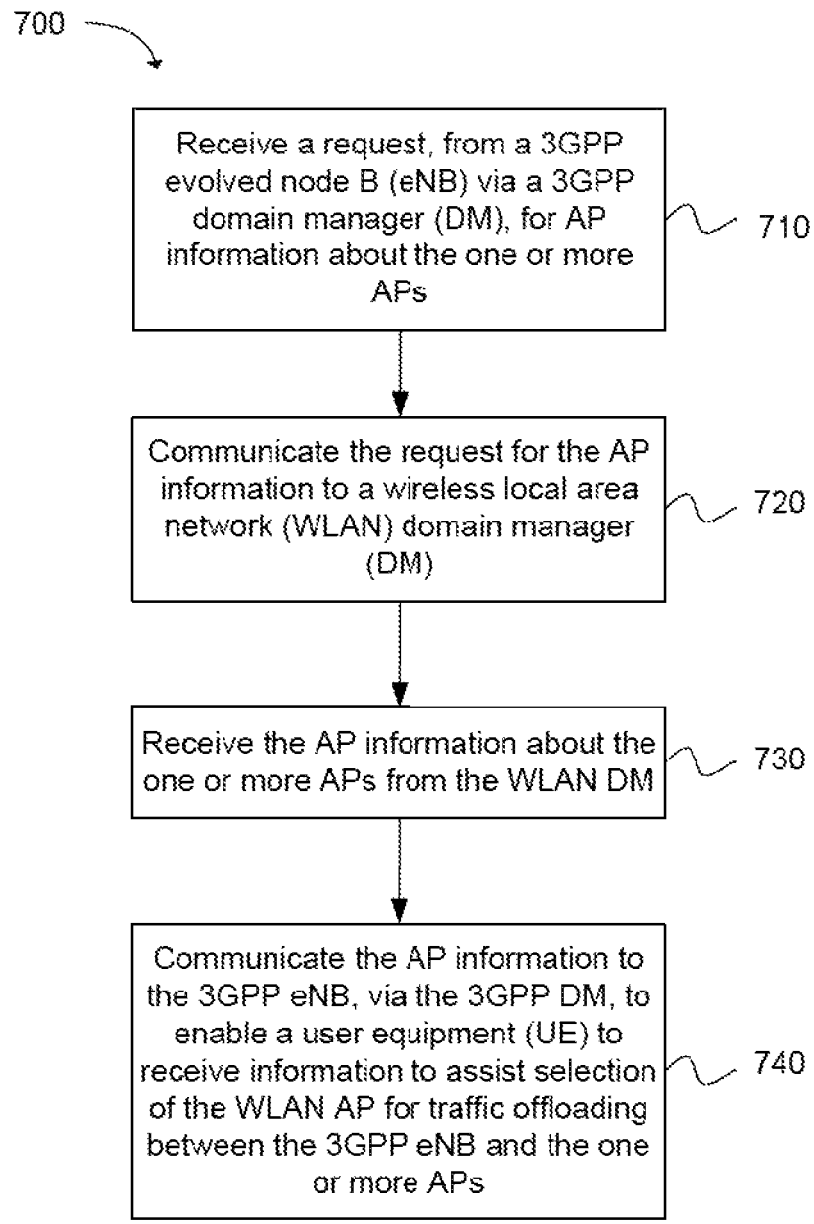
FIG. 7 depicts functionality of computer circuitry of Third Generation Partnership Project (3GPP) network manager (NM) operable to communicate information about one or more access points (APs) for traffic offloading in accordance with an example.

Another example provides functionality 700 of computer circuitry of a Third Generation Partnership Project (3GPP) network manager (NM) operable to communicate information about one or more access points (APs) for traffic offloading, as shown in the flow chart in FIG. 7. The functionality may be implemented as a method or the functionality may be executed as instructions on a machine, where the instructions are included on at least one computer readable medium or one non-transitory machine readable storage medium. The computer circuitry can be configured to receive a request, from a 3GPP evolved node B (eNB) via a 3GPP domain manager (DM), for AP information about the one or more APs, as in block 710. The computer circuitry can also be configured to communicate the request for the AP information to a wireless local area network (WLAN) domain manager (DM), as in block 720. The computer circuitry can be further configured to receive the AP information about the one or more APs from the WLAN DM, as in block 730. In addition, the computer circuitry can be configured to communicate the AP information to the 3GPP eNB, via the 3GPP DM, to enable a user equipment (UE) to receive information to assist selection of the WLAN AP for traffic offloading between the 3GPP eNB and the one or more APs, as in block 740.

In one example, the AP information includes at least one of: network identifiers, radio parameters, preference levels, and location information for the one or more APs. In addition, the computer circuitry may be further configured to receive a request for the AP information, from the 3GPP eNB, in response to the 3GPP eNB determining to offload traffic to the one or more APs.

In one configuration, the computer circuitry may be further configured to receive AP status update information from the WLAN DM: and communicate the AP status update information to the 3GPP eNB via the 3GPP DM. In one example, the AP status update information includes at least one of a new AP that is online, an existing AP that is offline, or an existing AP that is overloaded or not overloaded.

In one example, the computer circuitry may be further configured to communicate the AP status update information to the UE, wherein the LTE does not select the AP that is offline or overloaded for offloading. In addition, the computer circuitry may be further configured to communicate the AP status update information to the UE, wherein the UE selects the AP that has become online or not overloaded for offloading.

Figure 8:
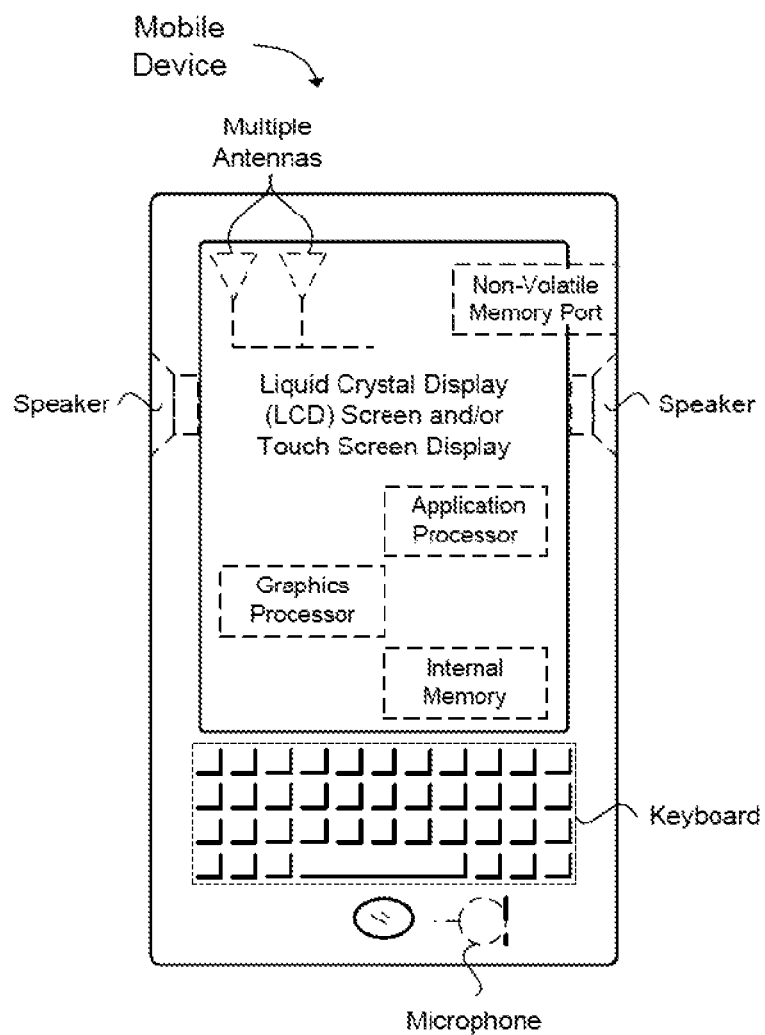
FIG. 8 illustrates a diagram of a wireless device (e.g., UE) in accordance with an example.

FIG. 8 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 8 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include, hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage deices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid Obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A Third Generation Partnership Project (3GPP) node operable to receive information about access points (APs) for traffic offloading, the 3GPP node comprising one or more processors and memory configured to:
send a request, to a network manager (NM) for access point (AP) information about one or more wireless local area network (WLAN) APs for traffic offloading, wherein the AP information includes network identifiers, radio parameters, preference levels that indicate radio and backhaul loading levels at the WLAN APs, and location information for WLAN APs considered for traffic offloading;
receive the AP information from the NM about the one or more WLAN APs, wherein the NM receives the AP information from a WLAN domain manager (WLAN DM), and the WLAN DM generates the AP information based on periodic or trigger based operations and management (OAM) reporting from the WLAN APs;
send an update request, to the NM via a 3GPP DM, for AP status update information about the one or more WLAN APs;
receive the AP status update information, from the NM via the 3GPP DM, about the one or more WLAN APs, wherein the AP status update information includes at least one of a new WLAN AP that is online or an existing WLAN AP that is now offline; and
communicate the AP information and the AP status update information to a user equipment (UE), wherein the AP information and the AP status update information enables the UE to select WLAN APs to receive data via traffic offloading between the 3GPP node and the one or more WLAN APs.

2. The 3GPP node of claim 1, wherein the AP information requested by the 3GPP node corresponds to a plurality of underlaid WLAN APs.

3. The 3GPP node of claim 1, wherein the one or more processors and memory are further configured to receive the AP information from a WLAN AP collocated with the 3GPP node, wherein the AP information is received at least one of: periodically or in response to an event.

4. The 3GPP node of claim 1, wherein the one or more processors and memory are further configured to receive the AP information directly from the one or more WLAN APs for traffic offloading.

5. The 3GPP node of claim 1, wherein the one or more processors and memory are further configured to receive the AP information from UE assistance reports, the UE assistance reports including UE measurements of power levels associated with the WLAN APs selected for traffic offloading.

6. The 3GPP node of claim 1, wherein the one or more processors and memory are further configured to communicate with an access network discovery and selection function (ANDSF) to receive the AP information.

7. The 3GPP node of claim 1, wherein the 3GPP node is selected from a group consisting of a base station (BS), a Node B (NB), an evolved Node B (eNB), a baseband unit (BBU), a remote radio head (RRH), a remote radio equipment (RRE), or a remote radio unit (RRU).

8. A method for communicating access point (AP) information for traffic offloading, the method comprising:
receiving a request, at a wireless local area network (WLAN) domain manager (DM) from an evolved node B (eNB), for access point (AP) information about one or more WLAN access points (APs) for traffic offloading, wherein the AP information includes network identifiers, radio parameters, preference levels that indicate radio and backhaul loading levels at the WLAN APs, and location information for WLAN APs considered for traffic offloading;
obtaining the access point (AP) information for the one or more WLAN APs, at the WLAN DM, based on periodic or trigger based operations and management (OAM) reporting from the one or more WLAN APs;

communicating the AP information, from the WLAN DM to the eNB via a network manager (NM), about the one or more WLAN APs; and communicating AP status update information from the WLAN DM to the eNB via the NM, wherein the AP status update information includes at least one of a new WLAN AP that is online or an existing WLAN AP that is now offline, wherein the AP information and the AP status update information are communicated from the WLAN DM to a user equipment (UE) via the NM and the eNB, enabling the UE to select WLAN APs to receive data via traffic offloading between the eNB and the one or more WLAN APs.

9. The method of claim 8, further comprising communicating the AP information, from the WLAN DM to the eNB, via the NM and a Third Generation Partnership Project (3GPP) domain manager (DM).

10. The method of claim 8, further comprising receiving the OAM reports containing the AP information, at the WLAN DM, based on a pulling mechanism to retrieve the AP information.

11. The method of claim 8, further comprising receiving the OAM reports containing the AP information at the WLAN DM based on a triggering mechanism implemented at the WLAN AP, wherein the triggering mechanism is at least one of: periodic, event based, or event periodic.

12. The method of claim 8, further comprising communicating WLAN AP location information to the UE, wherein the UE identifies WLAN APs located in proximity to the UE based on the WLAN AP location information.

13. The method of claim 8, further comprising:

receiving the AP status update information about the one or more WLAN APs based on OAM reports from the WLAN APs; and communicating the AP status update information, from the WLAN DM to the NM, about the WLAN APs, wherein the eNB receives the AP status update information via the NM and a Third Generation Partnership Project (3GPP) Element Manager (EM).

14. A Third Generation Partnership Project (3GPP) network manager (NM) operable to communicate information about one or more access points (APs) for traffic offloading, the 3GPP NM comprising one or more processors and memory configured to:

receive a request, from a 3GPP evolved node B (eNB) via a 3GPP domain manager (DM), for AP information about one or more APs for traffic offloading, wherein the AP information includes network identifiers, radio parameters, preference levels that indicate radio and backhaul loading levels at the APs, and location information for APs considered for traffic offloading;

communicate the request for the AP information to a wireless local area network (WLAN) domain manager (DM);

receive the AP information about the one or more APs from the WLAN DM, and the WLAN DM generates the AP information based on periodic or trigger based operations and management (OAM) reporting from the APs;

communicate the AP information to the 3GPP eNB via the 3GPP DM;

receive an update request, from the 3GPP eNB via a 3GPP DM, for AP status update information about the one or more APs;

communicate the AP status update information to the 3GPP eNB via the 3GPP DM, wherein the AP status update information includes at least one of a new AP that is online or an existing AP that is now offline, wherein the AP information and the AP status update information are communicated from the NM to a user equipment (UE) via the 3GPP eNB, enabling the UE to select APs to receive data via traffic offloading between the 3GPP eNB and the one or more APs.

15. The 3GPP NM of claim 14, wherein the one or more processors and memory are further configured to receive a request for the AP information, from the 3GPP eNB, in response to the 3GPP eNB determining to offload traffic to the one or more APs.

16. The 3GPP NM of claim 14, wherein the AP status update information includes an existing AP that is overloaded or not overloaded.

17. The 3GPP NM of claim 14, wherein the one or more processors and memory are further configured to communicate the AP status update information to the UE, wherein the UE does not select the AP that is offline or overloaded for offloading.

18. The 3GPP NM of claim 14, wherein the one or more processors and memory are further configured to communicate the AP status update information to the UE, wherein the UE selects the AP that has become online or not overloaded for offloading.

* * * * *